July 18, 1944.    A. R. THOMAS    2,353,859
REFRIGERATION
Filed April 29, 1941
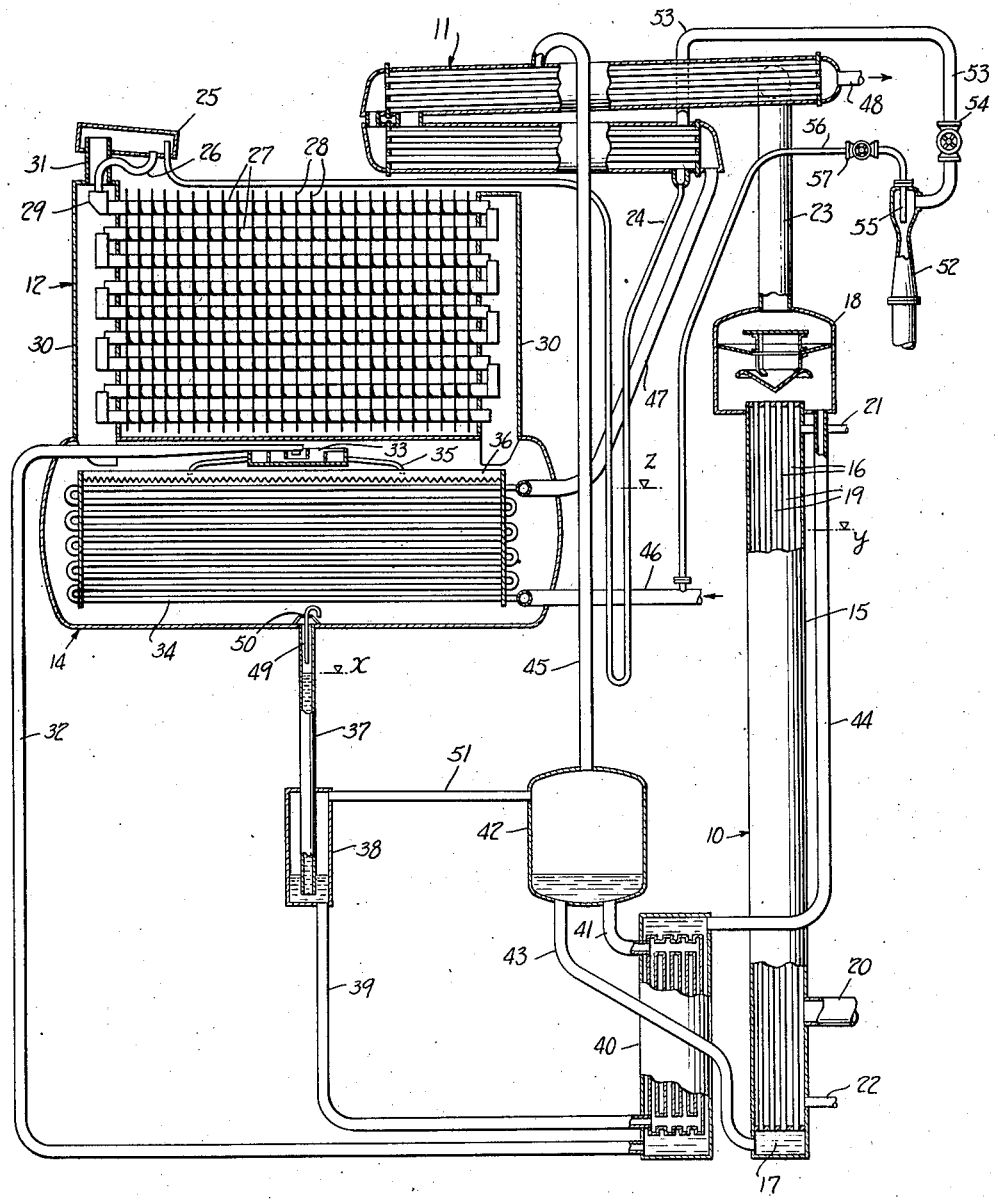
INVENTOR.
Albert R. Thomas
BY Ed Flexander
his ATTORNEY Patented July 18, 1944

2,353,859

UNITED STATES PATENT OFFICE 2,353,859

REFRIGERATION

Albert R. Thomas, Evansville, Ind., assignor to Servel, Inc., New York, N. Y., a corporation of Delaware Application April 29, 1941, Serial No. 390,871

10 Claims. (Cl. 62—119)

This invention relates to refrigeration, and more particularly to transferring of non-condensible gases in a refrigeration system from one part to another part from which the non-condensible gases are withdrawn.

During operation of refrigeration systems non-condensible gases may collect in parts thereof to produce objectionable increase in pressure. This is particularly true in refrigeration systems of the absorption type which operate at partial vacuum and at extremely low pressures. When non-condensible gases collect in the absorber of such a system a part of the absorber, in which absorption of refrigerant vapor by absorption liquid normally takes place, is rendered ineffective. The collection of non-condensible gases effects an increase in pressure in a refrigeration system to lower the efficiency of the system, and this is particularly undesirable in low pressure systems in which the collection of certain amounts of non-condensible gases effects a greater percentage increase in pressure than in higher pressure systems using a refrigerant like ammonia, for example.

It is an object of this invention to provide an improvement for transferring non-condensible gases in a refrigeration system from one part to another part thereof with the aid of an active fluid within the system, the transfer of gases being effected automatically and continuously to insure complete withdrawal of the gases from the first part at all times. More particularly, the present invention provides an improved arrangement for transferring non-condensible gases in an absorption refrigeration system from the absorber to the condenser or other part thereof, so that the absorber will always be capable of functioning as efficiently as possible. The transfer of non-condensible gases from the absorber is effected by the stream of absorption liquid flowing from the absorber to the generator. The non-condensible gases are entrained in a part of the absorption liquid circuit in such a manner that entrainment is effected continuously and automatically by simple gravity flow of the absoption liquid. The trapped gas is compressed in the downwardly flowing column of absorption liquid and flows therefrom at a higher pressure to the condenser.

It is another object of the invention to provide an improved arrangement for withdrawing non-condensible gases from the condenser of the refrigeration system at which part heat is given up to a suitable cooling medium, such as water, for example. This is accomplished by utilizing a water aspirator type of vacuum pump to withdraw non-condensible gases from the condenser to the atmosphere, and to utilize the cooling water that effects cooling of the condenser and other heat rejecting parts to operate such aspirator.

The invention, together with the above and other objects and advantages thereof, will be better understood from the following description taken in conjunction with the accompanying drawing forming a part of this specification, and of which the single figure more or less diagrammatically illustrates a refrigeration system embodying the invention.

Referring to the figure, the present invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator or vapor expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be had thereto for a detailed description of the refrigeration system. In the figure the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 forms a steam chamber about the tubes 16 to which steam is supplied through a conduit 20. The space 19 provides for full length heating of tubes 16, a vent 21 being formed at the upper end of shell 15. A conduit 22 is connected to the lower part of shell 15 for draining condensate from space 19.

The system operates at a partial vacuum and contains a water solution of refrigerant in absorbent liquid, such as, for example, a water solution of about 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid with the liquid following along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The condensate formed in condenser 11 flows through a U-tube 24 into a flash chamber 25 and from the latter through a conduit 26 into evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. The water passes through successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 28 passes out into end headers 30 which are connected at their lower ends to absorber 14. The flash chamber 25 is provided to take care of any vapor flashing of liquid being fed to evaporator 12 through U-tube 24. The flashed vapor formed in the initial cooling of the liquid flowing from condenser 11 passes through a conduit 31 into one of the headers 30 and mixes with vapor formed in the evaporator 12, so that disturbances in the evaporator due to vapor flashing are avoided.

In absorber 14 refrigerant vapor is absorbed into concentrated absorption liquid which enters through a conduit 32. The entering absorption liquid flows into a vessel 33 in which liquid is distributed laterally or cross-wise of a plurality of vertically disposed pipe banks 34 which are arranged along side of each other. The liquid flows from vessel 33 through conduits 35 into a plurality of liquid holders and distributors 36 which extend lengthwise of and above the uppermost horizontal branches of pipe banks 34. Absorption liquid is siphoned over the walls of the liquid holders 36 to effect complete wetting of the uppermost pipe sections. Liquid drips from each horizontal pipe section onto the next lower pipe section, whereby all of the pipe sections are wetted with a film of liquid.

The water vapor formed in evaporator 12 passes through the headers 30 into the absorber 14 where it is absorbed by the absorption liquid and, due to such absorption of water vapor, the absorption liquid is diluted. The diluted absorption liquid flows through a conduit 37 into a vessel 38, as will be described more fully hereinafter. From vessel 38 liquid flows through a conduit 39 into a first passage in liquid heat exchanger 40, conduit 41, vessel 42 and conduit 43 into the lower space 17 of generator 10. Water vapor is expelled out of solution in generator 10 by heating, and the solution is raised by gas or vapor-lift action in riser tubes 16, as explained above.

The absorption liquid in vessel 18 is concentrated since water vapor has been expelled therefrom in generator 10. This concentrated absorption liquid flows through a conduit 44, a second passage in liquid heat exchanger 40, and conduit 32 into the upper part of absorber 14. This circulation of absorption liquid results from the raising of liquid by vapor-lift action in vertical riser tubes 16, whereby the liquid can flow to absorber 14 and return from the latter to the generator 10 by force of gravity.

The upper part of vessel 42 is connected by a conduit 45 to condenser 11, so that the pressure in vessel 42 is equalized with the pressure in the upper part of generator 10 and condenser 11.

The heat liberated with absorption of water vapor in absorber 14 is transferred to a cooling medium, such as water, for example, which flows upward through the vertically disposed pipe banks 34. The cooling medium enters the lower ends of the pipe banks 34 through a conduit 46 and leaves the upper ends of the pipe banks 34 through a conduit 47. The conduit 47 is connected to condenser 11 whereby the same cooling medium may be utilized to cool both condenser 11 and absorber 14, and from condenser 11 the cooling medium flows through a conduit 48 to waste.

The system operates at low pressures with the generator 10 and condenser 11 operating at one pressure and the evaporator 12 and absorber 14 operating at a lower pressure, the pressure differential therebetween being maintained by liquid columns. Thus, the liquid column formed in tube 24 maintains the pressure differential between condenser 11 and evaporator 12, the liquid column in conduit 37, vessel 38 and conduit 39 maintains the pressure differential between the outlet of absorber 14 and generator 10, and the liquid column formed in conduit 32 and connected parts including conduit 44 maintains the pressure differential between the inlet of the absorber and the upper part of generator 10. In operation, the liquid columns may form in conduits 37, 44 and down-leg of tube 24 to the levels $x$, $y$ and $z$, for example. The conduits are of such size that restriction to gas flow is effected without appreciably restricting flow of liquid.

The liquid column formed in vessel 42 and conduit 43 provides the liquid reaction head for raising liquid in riser tubes 16 by vapor-lift action. The vessel 42 is of sufficient volume to hold the liquid differential in the system and is of such cross-sectional area that the liquid level therein does not appreciably vary, so that a substantially constant reaction head is provided for lifting liquid in generator 10.

During operation of the refrigeration system non-condensible gases may collect therein. Due to the high velocity of the water vapor entering absorber 14 from evaporator 12, the non-condensible gases in the lower pressure side of the system are swept by the water vapor toward the bottom part of the absorber.

In accordance with this invention, in order to transfer the non-condensible gases from the absorber 14 to the condenser 11, the outlet for the absorption liquid leaving absorber 14 at the upper end of conduit 37 is constructed and arranged so that non-condensible gases are injected or trapped into the downwardly flowing column of absorption liquid. By way of illustration, this is accomplished in the preferred embodiment shown by providing a tube 49 which is supported at 50 at the bottom of absorber 14 with the lower end thereof extending downwardly into conduit 37 and terminating above the liquid level in the latter. Absorption liquid leaving the absorber 14 about the outside of tube 49 passes into the downwardly flowing liquid column in conduit 37 and traps non-condensible gases from the tube 49. The non-condensible gases are trapped into the downwardly flowing column of liquid by injection action, the gases being trapped as bubbles which are carried downward by the absorption liquid stream leaving the absorber. It will thus be apparent that non-condensible gases in the lower part of absorber 14 are entrained in a part of the absorption liquid circuit through which absorption liquid is flowing toward generator 10, and that the gases are entrained in such a manner that removal of the gases from the absorber is effected continuously and automatically by simple gravity flow of the absorption liquid.

The conduits embodied in the refrigeration system are of such size that there is no appreciable restriction to flow of liquid, as explained above. The internal diameter of conduit 37 is sufficiently great so that the trapped gas bubbles do not completely bridge the liquid passage formed by the conduit, that is, the liquid can pass the gas bubbles and carry the bubbles downward in the conduit. As the trapped gas bubbles are carried downward by liquid, the gas is compressed due to the increasingly larger liquid head above the gas.

The gas bubbles escape from the lower end of conduit 37 which extends into the bottom part of vessel 38. The vessel 38 serves as a gas relief chamber with the compressed gas bubbles passing upward through the liquid therein. The liquid column maintained in conduit 37 is of sufficient length to maintain the pressure differential between absorber 14 and the parts of the higher pressure side of the system to which the vessel 38 is connected. The absorption liquid flows from vessel 38 through conduit 39 toward generator 10, as explained above, and the escaping non-condensible gases pass from the upper part of vessel 38 through conduit 51 into vessel 42, and thence through conduit 45 into the condenser 11.

The non-condensible gases collecting in condenser 11, together with the gases transferred from the absorber 14, are carried to the dead or far end of condenser 11 in the bottom part thereof by the sweeping effect of the expelled water vapor flowing into the condenser. Since the condenser 11 is at a higher pressure than the absorber 14, the non-condensible gases transferred from the low pressure side to the higher pressure side of the refrigeration system will occupy considerably less space in the condenser than in the absorber. In a refrigeration system of the character described above, for example, the normal operating pressure in the absorber may be about 7 mm. mercury and the pressure in the condenser more than eight times the absorber pressure or above 56 mm. mercury. By continuously and constantly removing non-condensible gases from absorber 14 as it collects in the low pressure side of the system, absorption of refrigerant vapor by absorption liquid can always take place within the entire absorber. In other words, the fact that only a relatively small quantity of non-condensible gases can accumulate and collect in the bottom part of the absorber, no part of the absorber in which absorption of refrigerant vapor by liquid normally takes place is rendered ineffective.

A simple water aspirator type of vacuum pump 52 is connected by conduit 53 to the lower part of condenser 11 to effect removal of non-condensible gases from the refrigeration system. The conduit 53 is provided with a suitable control valve 54 and is connected to the converging side of the Venturi tube forming the vacuum pump 52. A nozzle 55 is disposed within vacuum pump 52 at the region at which conduit 53 is connected to the pump and to which water under suitable pressure is delivered through a conduit 56.

The conduit 56 is connected to the conduit 46 through which cooling water is supplied to the absorber 14 and condenser 11, whereby the cooling medium that effects cooling of the heat rejecting parts of the refrigeration system is utilized to operate the aspirator. A suitable control valve 57 is provided in conduit 56 to control operation of the vacuum pump.

When it is desired to effect removal of non-condensible gases from the refrigeration system, the valve 57 is opened so that water will be supplied to nozzle 55 of the vacuum pump 52. The water passing through the nozzle 55 acquires a high velocity whereby a suction effect is produced. After the vacuum pump 52 is operating the valve 54 is opened, whereby the suction effect produced by the pump exhausts the non-condensible gases from the lower part of condenser 11 and discharges the gases to atmosphere.

After substantially all of the non-condensible gases have been removed from the refrigeration system, as may be determined by a suitable pressure indicating device, for example, the valve 54 is first closed to shut off the system from the atmosphere and thereafter the valve 57 is closed to shut the supply of water to the vacuum pump 52. In a refrigeration system in which the normal pressure existing in the condenser 11 is about 56 mm. mercury, a water aspirator type of vacuum pump can be satisfactorily employed in exhausting non-condensible gases from the system to the atmosphere with the aspirator being operated from a suitable source of water supply at a pressure of at least 30 pounds per square inch. A water aspirator vacuum pump is a relatively inexpensive type of vacuum pump which can be satisfactorily operated to exhaust non-condensible gases from the higher pressure side of a refrigeration system operating at a pressure of about 56 mm. mercury, whereas a vacuum pump connected to exhaust non-condensible gases directly from absorber 14 would be relatively expensive because it would then become necessary to produce a partial pressure as low as 7 mm. mercury which cannot be produced by a water aspirator type of vacuum pump.

While a single embodiment of the invention has been shown and described, it will be apparent to those skilled in the art, that various modifications and changes may be made without departing from the spirit and scope of the invention, as pointed out in the following claims.

What is claimed is:

1. A multi-pressure refrigeration system including an absorber, a generator having a member for raising liquid by vapor-lift action, a vertically extending conduit having the upper end thereof in communication with said absorber and connected to receive liquid raised by vapor-lift action in said generator, means providing a chamber into the lower part of which said conduit extends, means connecting the upper part of said chamber for communication with the upper part of said generator, a connection for conducting liquid from the lower part of said chamber to the lower part of said generator, the upper part of said conduit being formed and arranged so that absorption liquid introduced therein is capable of positively trapping non-condensible gas collecting in said absorber, whereby the trapped gas is carried downward in said conduit by the liquid and discharged at a higher pressure from the lower end thereof into the chamber.

2. An absorption refrigeration system including a generator in which vapor is expelled from solution and the solution is raised by vapor-lift action, a condenser in which the expelled liquid is condensed, an evaporator in which the condensate evaporates, an absorber in which the vapor formed in the evaporator is absorbed into absorption solution, means providing a chamber, conduit means connecting the upper part of said chamber and the condenser, a vertical conduit extending into said chamber, the upper end of said conduit being in communication with said absorber and connected to receive absorption solution raised by vapor-lift action in said generator, and said conduit being formed and arranged so that absorption solution traps non-condensible gas and carries such gas downwardly in said conduit, the gas being compressed during downward movement in the conduit and discharged from the lower end thereof into the upper part of the said chamber for flow through said conduit means to the condenser.

3. A two-pressure absorption refrigeration system comprising a generator and a condenser arranged to operate at one pressure and an evaporator and an absorber arranged to operate at a lower pressure, connections for the aforementioned parts to provide circuits for circulation of refrigerant and absorption liquid, structure embodied in the system for circulating absorption liquid into contact with non-condensible gas collecting in the absorber, said structure being so constructed and arranged that the non-condensible gas is compressed by the absorption liquid and subsequently released at a higher pressure to the condenser, and a vacuum pump of the water aspirator type for removing non-condensible gas from the condenser.

4. In an absorption refrigeration system having a plurality of elements interconnected for circulating a refrigerant and absorption liquid, said system having one group of elements operable at one pressure and another group of elements operable at a lower pressure with means for maintaining the pressure differential between the groups of elements, one portion of the system of interconnected elements comprising a vertically extending conduit connected to receive absorption liquid at its upper end from one of the elements of the low pressure group, a separating chamber into which the lower end of the conduit extends, means cooperating with the upper end of the conduit for positively withdrawing non-condensible gases from an element of the low pressure group and trapping the gases in the liquid flowing through the conduit to transfer the gases to the separating chamber, said absorption liquid in the conduit comprising a part of the means maintaining the pressure differential between the high and low pressure groups of elements, and means for connecting the separating chamber to an element of the high pressure group whereby the non-condensible gases will be transferred from an element of the low pressure group to an element of the high pressure group while maintaining the pressure differential between the groups of elements.

5. In an absorption refrigeration system having a plurality of elements interconnected for circulation of refrigerant and absorption liquid, said system having one group of elements operable at one pressure and another group of elements operable at a lower pressure with means for maintaining the pressure differential between the groups of elements, a fall tube pump embodied in the system for transferring non-condensible gases from an element of the low pressure group to an element of the high pressure group, said fall tube pump comprising a vertically extending conduit connected at its upper end to an element of the low pressure group to receive absorption liquid therefrom, an injector tube cooperating with the upper end of the conduit to positively withdraw non-condensible gases from the element and trap the gases in the absorption liquid flowing through the conduit, a separating chamber into which the lower end of the conduit extends, said absorption liquid in the conduit comprising a part of the means maintaining the pressure differential between the high and low pressure groups of elements, and means connecting the separating chamber to an element of the high pressure group whereby the non-condensible gases will be transferred from an element of the low pressure group to an element of the high pressure group while maintaining the pressure differential therebetween.

6. An absorption refrigeration system in which non-condensible gases may occur and having a generator and condenser operable at one pressure and an evaporator and absorber operable at a lower pressure, a vertically extending conduit having the upper end thereof in communication with said absorber and connected to receive absorption liquid therefrom, a vessel into which the lower end of the conduit extends, means connecting the upper part of the vessel with the condenser, means connecting the lower part of the vessel with the generator, and means cooperating with the upper end of the conduit for positively withdrawing non-condensible gases from the absorber and trapping the gases in the liquid to transfer them to the vessel whereby the non-condensible gases will flow into the condenser while the absorption liquid will flow to the generator.

7. In an absorption refrigeration system having a plurality of elements interconnected for circulation of refrigerant and absorption liquid, said system having one group of elements operable at one pressure and another group of elements operable at a lower pressure with means for maintaining the pressure differential between the groups of elements, a fall tube pump embodied in the system for withdrawing non-condensible gases from an element thereof, said fall tube pump comprising a vertically extending conduit connected at its upper end to the element from which the gases are to be withdrawn to receive liquid therefrom, an injector tube arranged concentrically in the upper end of the conduit and extending upwardly above the end of the conduit, the flow of liquid through the conduit and around the injector tube positively withdrawing non-condensible gases from the element through the tube and trapping the gases in the liquid, said liquid in the conduit comprising a part of the means maintaining the pressure differential between the high and low pressure groups of elements and a separating chamber into which the lower end of the conduit extends for separating the gases from the liquid.

8. In an absorption refrigeration system having a plurality of elements interconnected for circulation of refrigerant and absorption liquid, said system having one group of elements operable at one pressure and another group of elements operable at a lower pressure with means for maintaining the pressure differential between the groups of elements, one portion of the system of interconnected elements comprising a vertically extending conduit connected to receive absorption liquid at its upper end from one of the elements of the low pressure group, a separating chamber into which the lower end of the conduit extends, means cooperating with the upper end of the conduit for positively withdrawing non-condensible gases from the element and trapping the gases in the liquid to transfer them to the separating chamber, said absorption liquid in the conduit comprising a part of the means maintaining the pressure differential between the high and low pressure groups of elements, means connecting the separating chamber to an element of the high pressure group whereby the non-condensible gases will be transferred from an element of the low pressure group to an element of the high pressure group while maintaining the pressure differential between the groups of elements, and an exhaust pump connected to the element of the high pressure group to which the gases are transferred for exhausting the non-condensible gases to the atmosphere.

9. In an absorption refrigeration system in which non-condensible gases may occur and having a generator and condenser operable at one pressure and an evaporator and absorber operable at a lower pressure, said non-condensible gases in the generator being swept into the condenser by the refrigerant vapors where they accumulate adjacent the outlet therefrom and said gases in the evaporator being swept into the absorber by the refrigerant vapors where they accumulate adjacent the outlet therefrom, a vertically extending conduit having its upper end in communication with the absorber and connected to receive absorption liquid therefrom, a separating chamber into which the lower end of the conduit extends, means cooperating with the upper end of the conduit for positively withdrawing the non-condensible gases from the absorber and trapping the gases in the absorption liquid flowing through the conduit, means connecting the upper part of the separating chamber to the condenser, means connecting the lower part of the separating chamber to the base of the generator, said non-condensible gases flowing from the upper part of the separating chamber to the condenser through one conduit and said absorption liquid flowing from the lower part of the separating chamber to the generator through the other conduit, and an exhaust pump connected to the condenser for exhausting the non-condensible gases from all of the elements of the system to the atmosphere.

10. In an absorption refrigeration system in which non-condensible gases may occur and having a generator and condenser operable at one pressure and an evaporator and absorber operable at a lower pressure, a vertically extending conduit having the upper end thereof in communication with the absorber and connected to receive absorption liquid therefrom, a separating chamber into which the lower end of the conduit extends, an injector tube arranged concentrically in the upper end of the conduit and operable by the flow of absorption liquid through the conduit for withdrawing non-condensible gases from the absorber and entraining the gases in the absorption liquid, means connecting the upper part of the separating chamber with the condenser, means connecting the lower part of the separating chamber to the base of the generator, said non-condensible gases flowing from the upper part of the separating chamber to the condenser and said absorption liquid flowing from the lower part of the separating chamber to the generator, and an exhaust pump connected to the condenser for exhausting the non-condensible gases to the atmosphere.

ALBERT R. THOMAS.